(12) United States Patent
Gudem et al.

(10) Patent No.: US 9,154,179 B2
(45) Date of Patent: Oct. 6, 2015

(54) RECEIVER WITH BYPASS MODE FOR IMPROVED SENSITIVITY

(75) Inventors: Prasad Srinivasa Siva Gudem, San Diego, CA (US); Tamer Adel Kadous, San Diego, CA (US); Sumit Verma, San Diego, CA (US); Li-chung Chang, Irvine, CA (US)

(73) Assignee: QUALCOMM Incorporated, San Diego, CA (US)

( * ) Notice: Subject to any disclaimer, the term of this patent is extended or adjusted under 35 U.S.C. 154(b) by 136 days.

(21) Appl. No.: 13/172,660

(22) Filed: Jun. 29, 2011

(65) Prior Publication Data

US 2013/0003617 A1 Jan. 3, 2013

(51) Int. Cl.
*H04B 7/00* (2006.01)
*H04B 1/525* (2015.01)
*H04B 1/707* (2011.01)
*H04B 1/10* (2006.01)

(52) U.S. Cl.
CPC ............... *H04B 1/525* (2013.01); *H04B 1/109* (2013.01); *H04B 1/70712* (2013.01)

(58) Field of Classification Search
CPC ..... H04B 1/109; H04B 1/525; H04B 1/70712
USPC ........... 370/276–296; 330/302; 375/140, 151, 375/153
See application file for complete search history.

(56) References Cited

U.S. PATENT DOCUMENTS

| | | | |
|---|---|---|---|
| 3,911,364 A | 10/1975 | Langseth et al. | |
| 4,035,728 A | 7/1977 | Ishikawa et al. | |
| 4,035,729 A | 7/1977 | Perry | |
| 4,246,655 A | 1/1981 | Parker | |
| 4,326,294 A | 4/1982 | Okamoto et al. | |

(Continued)

FOREIGN PATENT DOCUMENTS

| | | |
|---|---|---|
| CN | 1523912 A | 8/2004 |
| CN | 1922795 A | 2/2007 |
| CN | 101228702 A | 7/2008 |
| CN | 101242158 A | 8/2008 |
| CN | 101523967 A | 9/2009 |

(Continued)

OTHER PUBLICATIONS

Myung-Woon Hwang et al., "A High IIP2 Direct-Conversion Receiver Using Even-Harmonic Reduction Technique for Cellular CDMA/PCS/GPS Applications," Circuits and Systems I: Regular Papers, IEEE Transactions on vol. 55, Issue: 9; Publication Year: 2008, pp. 2934-2943.

(Continued)

*Primary Examiner* — Gary Mui
(74) *Attorney, Agent, or Firm* — Ramin Mobarhan

(57) ABSTRACT

A receiver with bypass mode for improved sensitivity is disclosed. An apparatus is provided that includes a non-bypass signal path coupled to a receiver, the non-bypass signal path comprising a filter, a bypass signal path coupled to the receiver, the bypass signal path configure to bypass the filter, and a switch configured to couple an antenna to the non-bypass signal path during time intervals when signals transmitted by a related local transmitter are transmitted with a signal power that exceeds a threshold, and to couple the antenna to the bypass signal path during other time intervals. In another aspect, the switch is configured to couple the antenna to the non-bypass signal path during time intervals when a jamming signal in a selected frequency range is received with a signal power that exceeds a threshold, and to couple the antenna to the bypass signal path during other time intervals.

12 Claims, 7 Drawing Sheets

(56) References Cited

U.S. PATENT DOCUMENTS

| | | |
|---|---|---|
| 4,715,048 A | 12/1987 | Masamura |
| 4,742,563 A | 5/1988 | Fukumura |
| 4,756,023 A | 7/1988 | Kojima |
| 4,969,207 A | 11/1990 | Sakamoto et al. |
| 5,056,411 A | 10/1991 | Baker |
| 5,128,630 A | 7/1992 | Mijuskovic |
| 5,291,519 A | 3/1994 | Tsurumaru |
| 5,321,850 A | 6/1994 | Backstrom et al. |
| 5,345,601 A | 9/1994 | Takagi et al. |
| 5,390,342 A | 2/1995 | Takayama et al. |
| 5,559,838 A | 9/1996 | Nakagoshi |
| 5,566,364 A | 10/1996 | Mizoguchi et al. |
| 5,694,396 A | 12/1997 | Firouzbakht et al. |
| 5,697,083 A | 12/1997 | Sano |
| 5,761,613 A | 6/1998 | Saunders et al. |
| 5,794,159 A | 8/1998 | Portin |
| 5,805,643 A | 9/1998 | Seki et al. |
| 5,805,989 A | 9/1998 | Ushida |
| 5,835,853 A | 11/1998 | Enoki et al. |
| 5,940,452 A | 8/1999 | Rich |
| 5,999,815 A | 12/1999 | Tenbrook et al. |
| 5,999,990 A | 12/1999 | Sharrit et al. |
| 6,026,288 A | 2/2000 | Bronner |
| 6,040,732 A | 3/2000 | Brokaw |
| 6,044,254 A | 3/2000 | Ohta et al. |
| 6,063,961 A | 5/2000 | Kroner |
| 6,069,923 A | 5/2000 | Ostman et al. |
| 6,088,348 A | 7/2000 | Bell, III et al. |
| 6,208,844 B1 | 3/2001 | Abdelgany |
| 6,249,687 B1 | 6/2001 | Thomsen et al. |
| 6,407,689 B1 | 6/2002 | Bazarjani et al. |
| 6,424,683 B1 | 7/2002 | Schoellhorn |
| 6,430,237 B1 | 8/2002 | Anvari |
| 6,472,947 B1 | 10/2002 | Zeitz |
| 6,473,601 B1 | 10/2002 | Oda |
| 6,522,895 B1 | 2/2003 | Montalvo |
| 6,535,725 B2 | 3/2003 | Hatcher et al. |
| 6,600,759 B1 | 7/2003 | Wood |
| 6,600,907 B1 | 7/2003 | Taguchi |
| 6,600,931 B2 | 7/2003 | Sutton et al. |
| 6,657,498 B2 | 12/2003 | Park et al. |
| 6,806,777 B2 | 10/2004 | Franca-Neto |
| 6,819,941 B2 | 11/2004 | Dening et al. |
| 6,888,888 B1 | 5/2005 | Tu et al. |
| 6,952,594 B2 | 10/2005 | Hendin |
| 6,954,446 B2 | 10/2005 | Kuffner |
| 6,983,132 B2 | 1/2006 | Woo et al. |
| 6,985,712 B2 | 1/2006 | Yamakawa et al. |
| 6,987,950 B2 | 1/2006 | Coan |
| 7,013,166 B2 | 3/2006 | Clifford |
| 7,024,172 B1 | 4/2006 | Murphy et al. |
| 7,039,377 B2 | 5/2006 | Yates |
| 7,123,891 B2 | 10/2006 | Loke |
| 7,142,042 B1 | 11/2006 | Henry |
| 7,161,423 B2 | 1/2007 | Paul et al. |
| 7,167,044 B2 | 1/2007 | Li et al. |
| 7,187,239 B2 | 3/2007 | Yeh |
| 7,187,735 B2 | 3/2007 | Kent, III |
| 7,187,904 B2 | 3/2007 | Gainey et al. |
| 7,212,788 B2 | 5/2007 | Weber et al. |
| 7,224,231 B2 | 5/2007 | Wu |
| 7,260,377 B2 | 8/2007 | Burns et al. |
| 7,283,851 B2 | 10/2007 | Persico et al. |
| 7,299,021 B2 | 11/2007 | Parssinen et al. |
| 7,313,368 B2 | 12/2007 | Wu et al. |
| 7,317,894 B2 | 1/2008 | Hirose |
| 7,333,831 B2 | 2/2008 | Srinivasan et al. |
| 7,356,325 B2 | 4/2008 | Behzad et al. |
| 7,403,508 B1 | 7/2008 | Miao |
| 7,444,166 B2 | 10/2008 | Sahota et al. |
| 7,454,181 B2 | 11/2008 | Banister et al. |
| 7,477,106 B2 | 1/2009 | Van Bezooijen et al. |
| 7,570,111 B1 | 8/2009 | Vagher et al. |
| 7,599,675 B2 | 10/2009 | Mu et al. |
| 7,643,847 B2 | 1/2010 | Daanen et al. |
| 7,643,848 B2 | 1/2010 | Robinett et al. |
| 7,697,905 B2 | 4/2010 | Lee et al. |
| 7,728,664 B2 | 6/2010 | Chang et al. |
| 7,751,513 B2 | 7/2010 | Eisenhut et al. |
| 7,764,726 B2 | 7/2010 | Simic et al. |
| 7,848,724 B2 | 12/2010 | Bult et al. |
| 7,869,528 B2 | 1/2011 | Robinson |
| 7,877,075 B1 | 1/2011 | Jin et al. |
| 7,911,269 B2 | 3/2011 | Yang et al. |
| 7,944,298 B2 | 5/2011 | Cabanillas et al. |
| 7,949,309 B2 | 5/2011 | Rofougaran et al. |
| 7,952,398 B2 | 5/2011 | Salcido et al. |
| 8,022,772 B2 | 9/2011 | Cassia et al. |
| 8,055,229 B2 | 11/2011 | Huang |
| 8,063,706 B2 | 11/2011 | Li et al. |
| 8,081,672 B2 | 12/2011 | Kent et al. |
| 8,090,332 B2 | 1/2012 | Sahota et al. |
| 8,090,369 B2 | 1/2012 | Kitazoe |
| 8,139,670 B1 | 3/2012 | Son et al. |
| 8,149,955 B2 | 4/2012 | Tired |
| 8,195,117 B2 | 6/2012 | Bult et al. |
| 8,208,887 B2 | 6/2012 | Lee et al. |
| 8,217,723 B2 | 7/2012 | Rajendran et al. |
| 8,242,841 B2 | 8/2012 | Zhang |
| 8,290,449 B2 | 10/2012 | Keehr et al. |
| 8,295,778 B2 | 10/2012 | Kotecha et al. |
| 8,306,494 B2 | 11/2012 | Ojo |
| 8,442,473 B1 | 5/2013 | Kaukovuori et al. |
| 8,514,015 B2 | 8/2013 | Chen |
| 8,600,315 B2 | 12/2013 | Roufoogaran et al. |
| 8,626,084 B2 | 1/2014 | Chan et al. |
| 8,676,148 B2 | 3/2014 | Ogasawara |
| 8,706,069 B2 | 4/2014 | Khoini-Poorfard et al. |
| 2002/0008575 A1 | 1/2002 | Oskowsky et al. |
| 2002/0061773 A1 | 5/2002 | Adachi et al. |
| 2002/0111163 A1 | 8/2002 | Hamabe |
| 2002/0132597 A1 | 9/2002 | Peterzell et al. |
| 2002/0173337 A1 | 11/2002 | Hajimiri et al. |
| 2002/0193108 A1 | 12/2002 | Robinett |
| 2003/0076797 A1 | 4/2003 | Lozano |
| 2003/0081694 A1* | 5/2003 | Wieck ............ 375/316 |
| 2003/0125040 A1 | 7/2003 | Walton et al. |
| 2003/0148750 A1 | 8/2003 | Yan et al. |
| 2003/0157915 A1 | 8/2003 | Atkinson et al. |
| 2003/0176176 A1 | 9/2003 | Leinonen et al. |
| 2003/0203743 A1 | 10/2003 | Sugar et al. |
| 2003/0206076 A1 | 11/2003 | Hashemi et al. |
| 2003/0228851 A1 | 12/2003 | Taniguchi |
| 2004/0087290 A1 | 5/2004 | Schmidt et al. |
| 2004/0092243 A1* | 5/2004 | Hey-Shipton ............ 455/307 |
| 2004/0113746 A1 | 6/2004 | Brindle |
| 2004/0116086 A1 | 6/2004 | Huttunen |
| 2004/0121753 A1 | 6/2004 | Sugar et al. |
| 2004/0204104 A1 | 10/2004 | Horng et al. |
| 2004/0219959 A1 | 11/2004 | Khayrallah et al. |
| 2004/0224643 A1 | 11/2004 | Nakai |
| 2004/0253955 A1 | 12/2004 | Love et al. |
| 2004/0266356 A1 | 12/2004 | Javor et al. |
| 2005/0039060 A1 | 2/2005 | Okayasu |
| 2005/0075077 A1 | 4/2005 | Mach et al. |
| 2005/0079847 A1 | 4/2005 | Arafa |
| 2005/0118977 A1 | 6/2005 | Drogi et al. |
| 2005/0197090 A1 | 9/2005 | Stockstad et al. |
| 2005/0215204 A1* | 9/2005 | Wallace et al. ............ 455/78 |
| 2005/0215264 A1 | 9/2005 | Subramaniam et al. |
| 2005/0231290 A1 | 10/2005 | Hung et al. |
| 2005/0265084 A1 | 12/2005 | Choi |
| 2005/0277387 A1 | 12/2005 | Kojima et al. |
| 2006/0009177 A1 | 1/2006 | Persico et al. |
| 2006/0023745 A1 | 2/2006 | Koo et al. |
| 2006/0061773 A1 | 3/2006 | Lee et al. |
| 2006/0121937 A1 | 6/2006 | Son |
| 2006/0128322 A1 | 6/2006 | Igarashi et al. |
| 2006/0146693 A1 | 7/2006 | Mori et al. |
| 2006/0170503 A1 | 8/2006 | Lee et al. |
| 2006/0189286 A1 | 8/2006 | Kyu et al. |
| 2006/0222100 A1 | 10/2006 | Behzad |
| 2006/0234662 A1 | 10/2006 | Diloisy |
| 2006/0291428 A1 | 12/2006 | Filipovic |

(56) References Cited

U.S. PATENT DOCUMENTS

| | | | |
|---|---|---|---|
| 2007/0049332 A1* | 3/2007 | Higuchi | 455/556.1 |
| 2007/0060080 A1 | 3/2007 | Nishimura et al. | |
| 2007/0072577 A1 | 3/2007 | Rozenblit et al. | |
| 2007/0105517 A1 | 5/2007 | Chang et al. | |
| 2007/0142013 A1* | 6/2007 | Bucknor et al. | 455/234.1 |
| 2007/0177656 A1 | 8/2007 | Maruta et al. | |
| 2007/0177693 A1 | 8/2007 | Kluge | |
| 2007/0184801 A1 | 8/2007 | Kogawa et al. | |
| 2007/0197170 A1 | 8/2007 | Boos | |
| 2007/0197178 A1 | 8/2007 | Gu | |
| 2007/0197204 A1 | 8/2007 | Herczog et al. | |
| 2007/0202890 A1 | 8/2007 | Feher | |
| 2007/0242784 A1 | 10/2007 | Sampson et al. | |
| 2007/0243832 A1 | 10/2007 | Park et al. | |
| 2007/0262817 A1 | 11/2007 | Ciccarelli et al. | |
| 2007/0262871 A1 | 11/2007 | Yamagajo et al. | |
| 2008/0004078 A1 | 1/2008 | Barratt et al. | |
| 2008/0013654 A1 | 1/2008 | Rick et al. | |
| 2008/0116976 A1 | 5/2008 | Chang et al. | |
| 2008/0117999 A1 | 5/2008 | Kadous et al. | |
| 2008/0139151 A1 | 6/2008 | Ojo et al. | |
| 2008/0204148 A1 | 8/2008 | Kim et al. | |
| 2008/0224770 A1 | 9/2008 | Kim et al. | |
| 2008/0224791 A1 | 9/2008 | Cheng | |
| 2008/0225971 A1 | 9/2008 | Behzad | |
| 2008/0261650 A1 | 10/2008 | Piriyapoksombut et al. | |
| 2008/0297259 A1 | 12/2008 | Mu | |
| 2009/0124227 A1 | 5/2009 | Ishiguro | |
| 2009/0227214 A1 | 9/2009 | Georgantas et al. | |
| 2009/0237161 A1 | 9/2009 | Fagg | |
| 2009/0243869 A1 | 10/2009 | Sanderford, Jr. | |
| 2009/0253456 A1 | 10/2009 | Toh et al. | |
| 2009/0290659 A1 | 11/2009 | Petrovic et al. | |
| 2009/0323779 A1 | 12/2009 | Lennen | |
| 2010/0019970 A1 | 1/2010 | Farrokhi et al. | |
| 2010/0034094 A1 | 2/2010 | Tenny | |
| 2010/0040178 A1 | 2/2010 | Sutton et al. | |
| 2010/0041359 A1 | 2/2010 | Liu et al. | |
| 2010/0142440 A1 | 6/2010 | Inoue | |
| 2010/0195754 A1 | 8/2010 | Li et al. | |
| 2010/0197263 A1 | 8/2010 | Dwyer et al. | |
| 2010/0210226 A1 | 8/2010 | Matsuyama | |
| 2010/0210272 A1 | 8/2010 | Sundstrom et al. | |
| 2010/0210299 A1 | 8/2010 | Gorbachov | |
| 2010/0214184 A1 | 8/2010 | Tran et al. | |
| 2010/0225414 A1 | 9/2010 | Gorbachov | |
| 2010/0226327 A1 | 9/2010 | Zhang et al. | |
| 2010/0232493 A1* | 9/2010 | Thirumoorthy | 375/232 |
| 2010/0237947 A1 | 9/2010 | Xiong et al. | |
| 2010/0253435 A1 | 10/2010 | Ichitsubo et al. | |
| 2010/0265875 A1 | 10/2010 | Zhao et al. | |
| 2010/0271986 A1 | 10/2010 | Chen | |
| 2010/0272051 A1 | 10/2010 | Fu et al. | |
| 2010/0301946 A1 | 12/2010 | Borremans | |
| 2010/0311378 A1 | 12/2010 | Tasic et al. | |
| 2010/0328155 A1 | 12/2010 | Simic et al. | |
| 2010/0330977 A1 | 12/2010 | Kadous et al. | |
| 2011/0018635 A1 | 1/2011 | Tasic et al. | |
| 2011/0044380 A1 | 2/2011 | Marra et al. | |
| 2011/0050319 A1 | 3/2011 | Wong | |
| 2011/0084791 A1 | 4/2011 | Mun et al. | |
| 2011/0086603 A1* | 4/2011 | Toosi et al. | 455/192.1 |
| 2011/0110463 A1 | 5/2011 | Chang et al. | |
| 2011/0122972 A1 | 5/2011 | Lie et al. | |
| 2011/0165848 A1 | 7/2011 | Gorbachov et al. | |
| 2011/0193625 A1 | 8/2011 | Gatta et al. | |
| 2011/0194504 A1 | 8/2011 | Gorokhov et al. | |
| 2011/0204973 A1 | 8/2011 | Hu et al. | |
| 2011/0211533 A1 | 9/2011 | Casaccia et al. | |
| 2011/0217945 A1 | 9/2011 | Lehara et al. | |
| 2011/0222443 A1 | 9/2011 | Khlat | |
| 2011/0222444 A1 | 9/2011 | Khlat et al. | |
| 2011/0242999 A1 | 10/2011 | Palanki et al. | |
| 2011/0250926 A1 | 10/2011 | Wietfeldt et al. | |
| 2011/0268048 A1 | 11/2011 | Toskala et al. | |
| 2011/0268232 A1 | 11/2011 | Park et al. | |
| 2011/0292844 A1 | 12/2011 | Kwun et al. | |
| 2011/0299434 A1 | 12/2011 | Gudem et al. | |
| 2011/0300810 A1 | 12/2011 | Mikhemar et al. | |
| 2012/0009886 A1* | 1/2012 | Poulin | 455/78 |
| 2012/0013387 A1 | 1/2012 | Sankaranarayanan et al. | |
| 2012/0026862 A1 | 2/2012 | Sadri et al. | |
| 2012/0044927 A1 | 2/2012 | Pan et al. | |
| 2012/0056681 A1 | 3/2012 | Lee | |
| 2012/0057621 A1* | 3/2012 | Hong et al. | 375/219 |
| 2012/0195237 A1 | 8/2012 | Chan et al. | |
| 2012/0236829 A1 | 9/2012 | Takano et al. | |
| 2012/0293265 A1 | 11/2012 | Heikkinen et al. | |
| 2012/0294299 A1 | 11/2012 | Fernando | |
| 2012/0327825 A1 | 12/2012 | Gudem et al. | |
| 2012/0329395 A1 | 12/2012 | Husted et al. | |
| 2013/0003783 A1 | 1/2013 | Gudem et al. | |
| 2013/0043946 A1 | 2/2013 | Hadjichristos et al. | |
| 2013/0051284 A1 | 2/2013 | Khlat | |
| 2013/0114769 A1 | 5/2013 | Fernando | |
| 2013/0163492 A1 | 6/2013 | Wong | |
| 2013/0217398 A1 | 8/2013 | Winiecki et al. | |
| 2013/0230080 A1 | 9/2013 | Gudem et al. | |
| 2013/0231064 A1 | 9/2013 | Gudem et al. | |
| 2013/0265892 A1 | 10/2013 | Fernando | |
| 2013/0315348 A1 | 11/2013 | Tasic et al. | |
| 2013/0316668 A1 | 11/2013 | Davierwalla et al. | |
| 2013/0316669 A1 | 11/2013 | Davierwalla et al. | |
| 2013/0316670 A1 | 11/2013 | Tasic et al. | |
| 2013/0329665 A1 | 12/2013 | Kadous et al. | |
| 2014/0072001 A1 | 3/2014 | Chang et al. | |
| 2014/0113578 A1 | 4/2014 | Xu | |
| 2014/0269853 A1 | 9/2014 | Gudem et al. | |

FOREIGN PATENT DOCUMENTS

| | | |
|---|---|---|
| CN | 101789805 A | 7/2010 |
| EP | 1164719 A1 | 12/2001 |
| EP | 1370012 | 12/2003 |
| EP | 1398887 A1 | 3/2004 |
| EP | 1708372 A2 | 10/2006 |
| EP | 1726098 A1 | 11/2006 |
| EP | 1748567 A2 | 1/2007 |
| EP | 1761076 A2 | 3/2007 |
| EP | 2068583 A1 | 6/2009 |
| EP | 2141818 A1 | 1/2010 |
| EP | 1916767 | 12/2010 |
| EP | 2393205 A2 | 12/2011 |
| EP | 2398285 A1 | 12/2011 |
| GB | 2472978 A | 3/2011 |
| JP | 05227234 | 9/1993 |
| JP | H0730452 A | 1/1995 |
| JP | 07221684 | 8/1995 |
| JP | 9027778 A | 1/1997 |
| JP | 09116458 | 5/1997 |
| JP | H11127300 A | 5/1999 |
| JP | 2000013278 A | 1/2000 |
| JP | 2001285114 | 10/2001 |
| JP | 2002261880 A | 9/2002 |
| JP | 2004015162 A | 1/2004 |
| JP | 2006520143 A | 8/2006 |
| JP | 2007324711 A | 12/2007 |
| JP | 2008085793 A | 4/2008 |
| JP | 2008519535 A | 6/2008 |
| JP | 2009130867 A | 6/2009 |
| JP | 2011015112 A | 1/2011 |
| JP | 2011082669 A | 4/2011 |
| JP | 2011091747 A | 5/2011 |
| JP | 2011119807 A | 6/2011 |
| WO | 0150636 | 7/2001 |
| WO | 0237686 | 5/2002 |
| WO | 2005039060 | 4/2005 |
| WO | 2005062477 A2 | 7/2005 |
| WO | 2005088847 A1 | 9/2005 |
| WO | 2006050515 A2 | 5/2006 |
| WO | 2006118538 A2 | 11/2006 |
| WO | 2008059257 A1 | 5/2008 |
| WO | 2008084539 A1 | 7/2008 |
| WO | 2008092745 A1 | 8/2008 |

(56) References Cited

FOREIGN PATENT DOCUMENTS

| WO | 2008103757 | | 8/2008 |
|---|---|---|---|
| WO | 2008145604 | A1 | 12/2008 |
| WO | 2010059257 | A1 | 5/2010 |
| WO | 2011019850 | A1 | 2/2011 |
| WO | 2011050729 | A1 | 5/2011 |
| WO | 2011092005 | A1 | 8/2011 |
| WO | 2011138697 | A1 | 11/2011 |
| WO | 2012008705 | A2 | 1/2012 |
| WO | 2012049529 | A1 | 4/2012 |
| WO | 2012158976 | | 11/2012 |
| WO | 2013036794 | A1 | 3/2013 |
| WO | 2013131047 | | 9/2013 |

OTHER PUBLICATIONS

Winternitz, L.M.B. et al; "A GPS Receiver for High-Altitude Satellite Navigation," Selected Topics in Signal Processing, IEEE Journal of; vol. 3, Issue: 4; Publication Year: 2009, pp. 541-556.

Aparin et al., "A Highly-integrated tri-band/quad-mode SiGe BiCMOS RF-to-baseband and receiver for wireless CDMA/WCDMA/AMPS applications with GPS capability", Solid State Circuits Conference, 2002. Digest Of Technical Papers. 2002 IEEE International Feb. 3-7, 2002, Piscataway, NJ, USA, IEEE, vol. 1, 2002, pp. 234-235, XP010585547, ISBN: 0-7803-7335-9.

Chen, et al., "A monolithic 5.9-GHz CMOS I/Q direct-down converter utilizing a quadrature coupler and transformer-coupled subharmonic mixers," Microwave and Wireless Components Letters, IEEE, vol. 16, No. 4, 2006, pp. 197-199.

Garuda, et al., "A Multi-based CMOS RF Front-end for 4G WiMAX and WLAN Applications," 2006 IEEE International Symposium on Circuits and Systes, 2006. ISCAS 2006. May 2006, 4 pages.

Henrik M et al., "A Full Duplex Front End Module for WiFi 802.11.n Applications" European Microwave Association, vol. 12, No. 4, Oct. 2008, pp. 162-165.

Jones W. W., et al., "Narrowband interference suppression using filter-bank analysis/synthesis techniques", Military Communications Conference, 1992. MILC0M '92, Conference Rec0r D. Communications—Fusing Command, Control and Intelligence., IEEE San Diego, CA, USA, Oct. 11-14, 1992, New York, NY, USA, IEEE, US, Oct. 11, 1992, pp. 898-902, XP010060840, DOI: 10.1109/MILCOM.1992.243977, ISBN: 978-0-7803-0585-4.

Kevin W et al., "3G/4G Multimode Cellular Front End Challenges", Part 2: Architecture Discussion, RFMD® White Paper, 9 pages.

Lai, C.M.,et al., "Compact router transceiver architecture for carrier aggregation systems", Microwave Conference (EUMC), 2011 41st European, IEEE, Oct. 10, 2011, pp. 693-696, XP032072825, ISBN: 978-1-61284-235-6 the whole document.

MSM6000 Chipset Solution, Qualcomm Incorporated.

MSM6500 Chipset Solution, Qualcomm Incorporated.

Pitschi M. et al., "High Performance Microwave Acoustic Components for Mobile Radios", Ultrasonics Symposium (IUS), 2009 IEEE International, EPCOS AG, Munich, Germany, vol. 1, Sep. 20-23, 2009.

Qualcomm Europe: "UE Implementation Impact due to 4C-HSDPA Operation", 3GPP Draft; R1-094067_UE_IMPL_Impact_4C_HSDPA, 3RD Generation Partnership Project (3GPP), Mobile Competence Centre; 650, Route Des Lucioles ; F-06921 Sophia-Antipolis Cedex ; France, No. Miyazaki; 20091012, Oct. 12, 2009, XP050388547, [retrieved on Oct. 6, 2009].

"UMTS Picocell Front End Module", CTS Corp. 8 pages.

Philips: "Capabilities of multi-transceiver UES", 3GPP Draft; R1-103913, 3rd Generation Partnership Project (3GPP), Mobile Competence Centre; 650, Route Des Lucioles; F-06921 Sophia-Antipolis Cedex; France, vol. RAN WG1, No. Dresden, Germany; 20100628, Jun. 22, 2010, XP050449298, [retrieved on Jun. 22, 2010] the whole document.

3GPP TS 36.101 V11.0.0, 3rd Generation Partnership Project; Technical Specification Group Radio Access Network; Evolved Universal Terrestrial Radio Access (E-UTRA); User Equipment (UE) radio transmission and reception (Release 11), Mar. 2012.

Aparin et al., "A Highly-integrated tri-band/quad-mode SiGe BiCMOS RF-to-baseband and receiver for wireless CDMA/WCDMA/AMPS applications with GPS capability", Solid-State Circuits Conference, 2002. Digest of Technical Papers. 2002 IEEE International Feb. 3-7, 2002, Piscataway, NJ, USA, IEEE, vol. 1, 2002, pp. 234-235, XP010585547, ISBN: 0-7803-7335-9.

Broyde F., et al., "The Noise Performance of aMultiple-Input-Port and Multiple-Output-Port Low-Noise Amplifier Connected to an Array of Coupled Antennas," International Journal of Antennas and Propagation, vol. 2011, Article ID 438478, Jul. 18, 2011, 12 pages.

Chen, et al, "A 5-6 GHz 1-V CMOS Direct-Conversion Receiver With an Integrated Quadrature Coupler," IEEE Journal of Solid-State Circuits, vol. 42, No. 9, 2007, pp. 1963-1975.

Chen, et al., "A monolithic 5.9-GHz CMOS I/Q direct-down converter utilizing a quadrature coupler and transformer-coupled subharmonic mixers," Microwave and Wireless Components Letters, IEEE, vol. 16, No. 4, 2006, pp. 197-199.

Garuda, et al., "A Multi-band CMOS RF Front-end for 4G WiMAX and WLAN Applications," 2006 IEEE International Symposium on Circuits and Systes, 2006. ISCAS 2006. May 2006, 4 pages.

Hashemi, et al., "Concurrent Multiband Low-Noise Amplifiers—Theory, Design, and Applications," IEEE Transactions on Microwave Theory and Techniques, vol. 50, No. 1, Jan. 2002.

Henrik M et al., "A Full Duplex Front End Module for WiFi 802.11.n Applications", European Microwave Association, vol. 12, No. 4, Oct. 2008, pp. 162-165.

International Search Report and Written Opinion—PCT/US2012/045129—ISA/EPO—Nov. 7, 2012.

Jones W. W., et al., "Narrowband interference suppression using filter-bank analysis/synthesis techniques", Military Communications Conference, 1992. MILCOM '92, Conference Recor D. Communications—Fusing Command, Control and Intelligence., IEEE San Diego, CA, USA, Oct. 14, 1992, New York, Ny, USA, IEEE, US, Oct. 11, 1992, pp. 898-902, XP010060840, DOI: 10.1109/MILCOM. 1992.243977, ISBN: 978-0/7803-0585-4.

Jussi R et al., "A Dual-Band RF Front-End for WCDMA and GSM Applications", IEEE, Journal Solid-State Circuits, 2001, vol. 36, No. 8, pp. 1198-1204.

Kevin W et al., "3G14G Multimode Cellular Front End Challenges", Part 2: Architecture Discussion, RFMD® White Paper, 9 pages, 2009.

Kim, T.W., et al., Highly Linear Receiver Front-End Adopting MOSFET Transconductance Linearization by Multiple Gated Transistors, IEEE Journal of Solid-State Circuits, United States, IEEE, Jan. 1, 2004, vol. 39, No. 1, pp. 223-229.

Lai, C.M., et al., "Compact router transceiver architecture for carrier aggregation systems", Microwave Conference (EUMC), 2011 41st European, IEEE, Oct. 10, 2011, pp. 693-696, XP032072825, ISBN: 978-1-61284-235-6 the whole document.

Lee et al., "Development of Miniature Quad SAW filter bank based on PCB substrate", IEEE Intl Frequency Control Symp, pp. 146-149, 2007.

MSM6000 Chipset Solution, Qualcomm Incorporated, 2003.

MSM6500 Chipset Solution, Qualcomm Incorporated, 2004.

Pitschi M. et al., "High Performance Microwave Acoustic Components for Mobile Radios", Ultrasonics Symposium (IUS), 2009 IEEE International, EPCOS AG, Munich, Germany, vol. 1, 20-23 Sep. 2009.

Qualcomm Europe: "UE Implementation Impact due to 4C-HSDPA Operation", 3GPP Draft; R1-094067_UE_IMPL_IMPACT_4C_HSDPA, 3RD Generation Partnership Project (3GPP), Mobile Competence Centre; 650, Route Des Lucioles ; F-06921 Sophia-Antipolis Cedex ; France, No. Miyazaki; Oct. 12, 2009, XP050388547, [retrieved on Oct. 6, 2009].

Rahn D.G., et al., "A fully integrated multiband MIMO WLAN transceiver RFIC," IEEE J. Solid-State Circuits, 2005, vol. 40 (8), 1629-1641.

Sever et al. "A Dual-Antenna Phase-Array Ultra-Wideband CMOS Transceiver". IEEE Communications Magazine [Online] 2006, vol. 44, Issue 8, pp. 102-110. See pp. 104-107.

Tasic a. et al., "Design of Adaptive Multimode RF Front-End Circuits", IEEE Journal of Solid-State Circuits, vol. 42, Issue 2, Feb. 2007 pp. 313-322.

"UMTS Picocell Front End Module", CTS Corp. 8 pages, 2011 via archive.org/web.

\* cited by examiner

RECEIVER WITH BYPASS MODE FOR IMPROVED SENSITIVITY

BACKGROUND

1. Field

The present application relates generally to the operation and design of transceivers, and more particularly, to improving the sensitivity of receivers.

2. Background

High quality signal reception is especially important for the current generation of portable devices. Typically, such devices provide multiple services, such as wide area network (WAN) communication services, wireless local area network (WLAN) communication services, and various other communication services. A device may include several transceivers to provide such communication services. Accordingly, each transceiver within a device should be carefully designed to reject interfering signals and receive desired signals with high sensitivity.

Signal interference may be especially problematic in multi-radio coexistence scenarios where, for example, a portable device includes a WAN transceiver and a WLAN transceiver. In this coexistence scenario, strong radio frequency (RF) jamming signals can appear at the input of the WAN receiver due to transmissions by the local related WAN transmitter. Furthermore, jamming signals from external transmitters may also appear at the input to the WAN receiver. Such signals may jam the WAN receiver and thus interfere with WAN signal reception.

To address this problem, a filter, such as a duplexer, is typically inserted in the receive signal path to suppress jamming signals associated with transmissions by the local related WAN transmitter or external transmitters. Unfortunately, the filter introduces an insertion loss of up to approximately 2.5 dB into the receive signal path. Thus, at times when there are no jamming signals present, the received WAN signals still experience the insertion loss of the duplexer thereby reducing the sensitivity of the WAN receiver.

Therefore, it would be desirable to have an efficient way to overcome the insertion loss of a duplexer or other filter utilized in a radio front end to improve receiver sensitivity.

BRIEF DESCRIPTION OF THE DRAWINGS

The foregoing aspects described herein will become more readily apparent by reference to the following description when taken in conjunction with the accompanying drawings wherein.

DETAILED DESCRIPTION

The detailed description set forth below in connection with the appended drawings is intended as a description of exemplary embodiments of the invention and is not intended to represent the only embodiments in which the invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well known structures and devices are shown in block diagram form in order to avoid obscuring the novelty of the exemplary embodiments presented herein.

Figure 1:
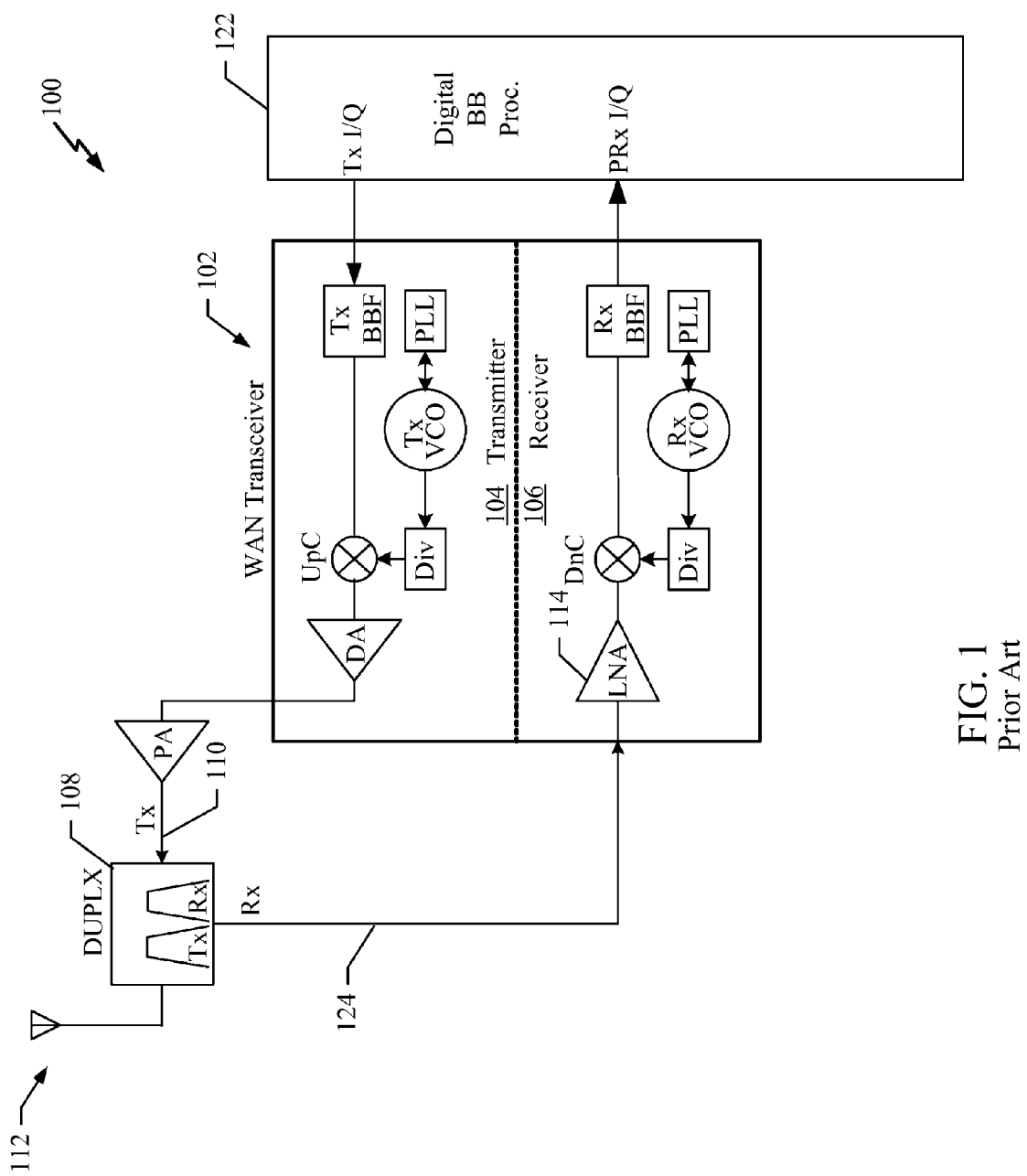
FIG. 1 shows a diagram of a conventional front end suitable for use in a communication device.

FIG. 1 shows a diagram of a conventional front end 100 suitable for use in a communication device. For example, the front end 100 is suitable for use in a portable wireless device, such as a smart phone.

The front end 100 includes a local WAN transceiver 102 that comprises local related transmitter 104 and receiver 106 that transmit and receive voice, data, or other information over a communication network. The transceiver 102 is considered local because it is located within the communication device. The transmitter 104 and receiver 106 are related in that they operate together to provide bidirectional communications with an external entity using a particular communication protocol. A duplexer 108 filters and routes a transmit signal 110 from the transmitter 104 to an antenna 112 for transmission. Signals received by the antenna 112 are input to the duplexer 108 where they are filtered and then input to a low noise amplifier (LNA) 114 of the related receiver 106. Thus, the local related transmitter 104 and receiver 106 operate together to communicate with a wireless network using a WAN access technology.

The local related transmitter 104 and receiver 106 communicate with a digital baseband (BB) processor 124. The digital BB processor 122 processes information that is transmitted or received using the local WAN transceiver 102. Thus, the processor 122 knows when and at what power level data will be transmitted by the transmitter 104.

During operation of the front end 100, a number of de-sensing events may occur to de-sense the receiver 106. The following is a list of de-sensing events that may de-sense the receiver 106, however, it should be noted that the list is not exhaustive and that other de-sensing events are possible.

1. Receive band noise from the WAN transmitter 104
2. Jamming signals leaking from the WAN transmitter 104 to the WAN receiver 106
3. Other jamming signals received by the antenna 112 (i.e., jamming signals in a wide band, such as 0-12 GHz)

The duplexer 108 is utilized to address the various de-sensing events listed above. For example, in one exemplary implementation, the duplexer 108 provides approximately 55 dB of rejection outside the receive signal band. This level of rejection reduces the maximum received signal power of a jamming signal so that the LNA 114 operates properly.

Unfortunately, the duplexer 108 introduces approximately 2.5 dB of insertion loss (IL) which reduces the sensitivity of the receiver 106. Accordingly, exemplary embodiments of the disclosed receiver with improved sensitivity operate to reduce or eliminate the signal loss introduced by the duplexer 108.

In various exemplary aspects, a receiver with improved sensitivity is disclosed. For the purpose of this description, the various aspects are described herein with reference to a WAN receiver; however, the various aspects are equally applicable to other types of receivers.

Figure 2:
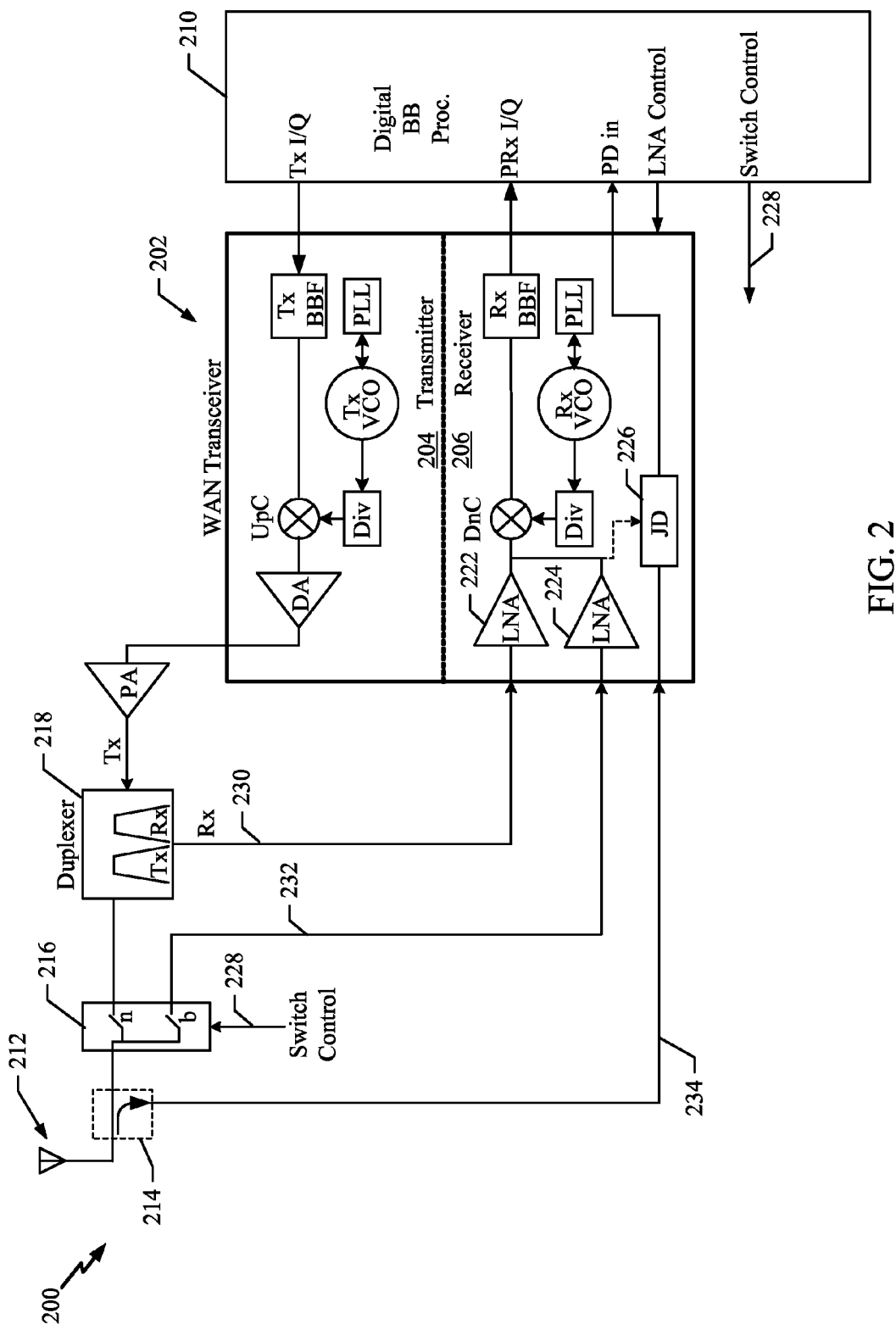
FIG. 2 shows an exemplary front end that comprises a receiver configured for improved sensitivity.

FIG. 2 shows an exemplary front end 200 that comprises a receiver configured for improved sensitivity. For example, the front end 200 is suitable for use in a portable wireless device, such as a smart phone. For the purpose of this description, the front end 200 is shown comprising a local WAN transceiver 202; however, the disclosed embodiments are equally applicable to other types of transceivers. The local WAN transceiver 202 comprises related transmitter 204 and receiver 206. The front end 200 also comprises a digital baseband processor 210, antenna 212, receive power coupler 214, antenna switch 216, and duplexer 218.

The antenna switch 216 comprises any suitable switching device or circuit and operates to selectively open and close switch (n) based on a switch control signal 228 to disconnect/connect the antenna 202 from/to the duplexer 218 so that signals can flow between the antenna 212 and the local WAN receiver 206 on a non-bypass signal path 230. The antenna switch 216 also operates to selectively open and close switch (b) based on the switch control signal 228 to disconnect/connect the antenna 202 from/to the LNA 224 of the receiver 206 so that signals can flow between the antenna 212 and the LNA 224 of the receiver 206 on a bypass signal path 232.

The duplexer 218 is a filter such as a SAW filter, thin film bulk resonator (FBAR) filter, bulk acoustic wave filter (BAW) filter, microelectromechanical system (MEMS) filter or any other type of suitable filter.

The receive power coupler 214 comprises any suitable power coupler that operates to detect received signal power over any desired frequency band, such as a wide band (i.e., 0-12 GHz). The output 234 of the power coupler 214 is input to a jammer detector (JD) 226. The power coupler 214 has a small insertion loss (i.e., about 0.25 dB); however, such low signal loss does not appreciably affect performance.

The jammer detector 226 detects the levels of potential jamming signals in the power coupler output 234 and inputs this information to the digital BB processor 210. For example, the detector 226 detects when the power level of one or more jamming signals in the power coupler output 234 exceeds a selected threshold (i.e., −45 dBm) and inputs this information to the digital BB processor 210.

In an optional implementation, the output of the LNAs (222, 224) is coupled to the jammer detector 226 (shown as a dashed line) so that the power detection function is performed on the LNA output and not on the output 234 of the power coupler 214. In this implementation, the power coupler 214 is not needed and the jammer detector 226 will not be affected by signals that are filtered by other front end components, such as matching networks (not shown).

The digital BB processor 210 outputs the switch control signal 228 to control whether the front end 200 operates in a non-bypass mode or a bypass mode. During operation in the bypass mode, the duplexer 218 is bypassed so that signals received at the antenna 212 flow to the receiver 206 on the bypass path 232 enabling the receiver 206 to operate with improved sensitivity. Additional detail about the non-bypass and bypass modes is provided below.

Non-Bypass Mode

To enable the non-bypass mode, the digital BB processor 210 sets the switch control signal 228 to control the switch (n) to connect the antenna 212 to the duplexer 218 and to control the switch (b) to disconnect the antenna 212 from the LNA 224. Furthermore, the digital BB processor 210 sets the LNA control signal to enable the LNA 222 and disable the LNA 224. This mode of operation can be utilized when the local related transmitter 204 is actively transmitting signals that can jam the receiver 206. Thus, in the non-bypass operating mode, the duplexer 218 is utilized to suppress jamming signals.

The non-bypass mode is also used when the power detector 226 detects the presence of jamming signals in either the output 234 of the power coupler 214 or the output of the LNAs (222, 224) depending on the configuration used. The output of the detector 226 is input to the digital BB processor 210 and based on this information, the processor 210 sets the switch control signal 228 to enable or disable the non-bypass mode.

Unfortunately, in the non-bypass mode, the duplexer 218 includes an insertion loss of about 2.5 dB in the receive signal path 230, which operates to degrade any signals that are passed to the receiver 206. As a result, the received signals are received at the LNA 222 with a much lower signal level. Thus, in non-bypass mode, the receiver 206 operates with less sensitivity.

Bypass Mode

To enable the bypass mode, the digital BB processor 210 sets the switch control signal 228 to control the switch (n) to disconnect the antenna 212 from the duplexer 218 and to control the switch (b) to connect the antenna 212 to the LNA 224. Furthermore, the digital BB processor 210 sets the LNA control signal to disable the LNA 222 and enable the LNA 224. Thus, in the bypass operating mode, the duplexer 218 is bypassed so that signals received by the antenna 212 flow to the LNA 224 of the receiver 206. Since the duplexer 218 is not in the signal path 232, its insertion loss is not experienced by the received signals and therefore the receiver 206 operates with improved sensitivity.

Figure 3:
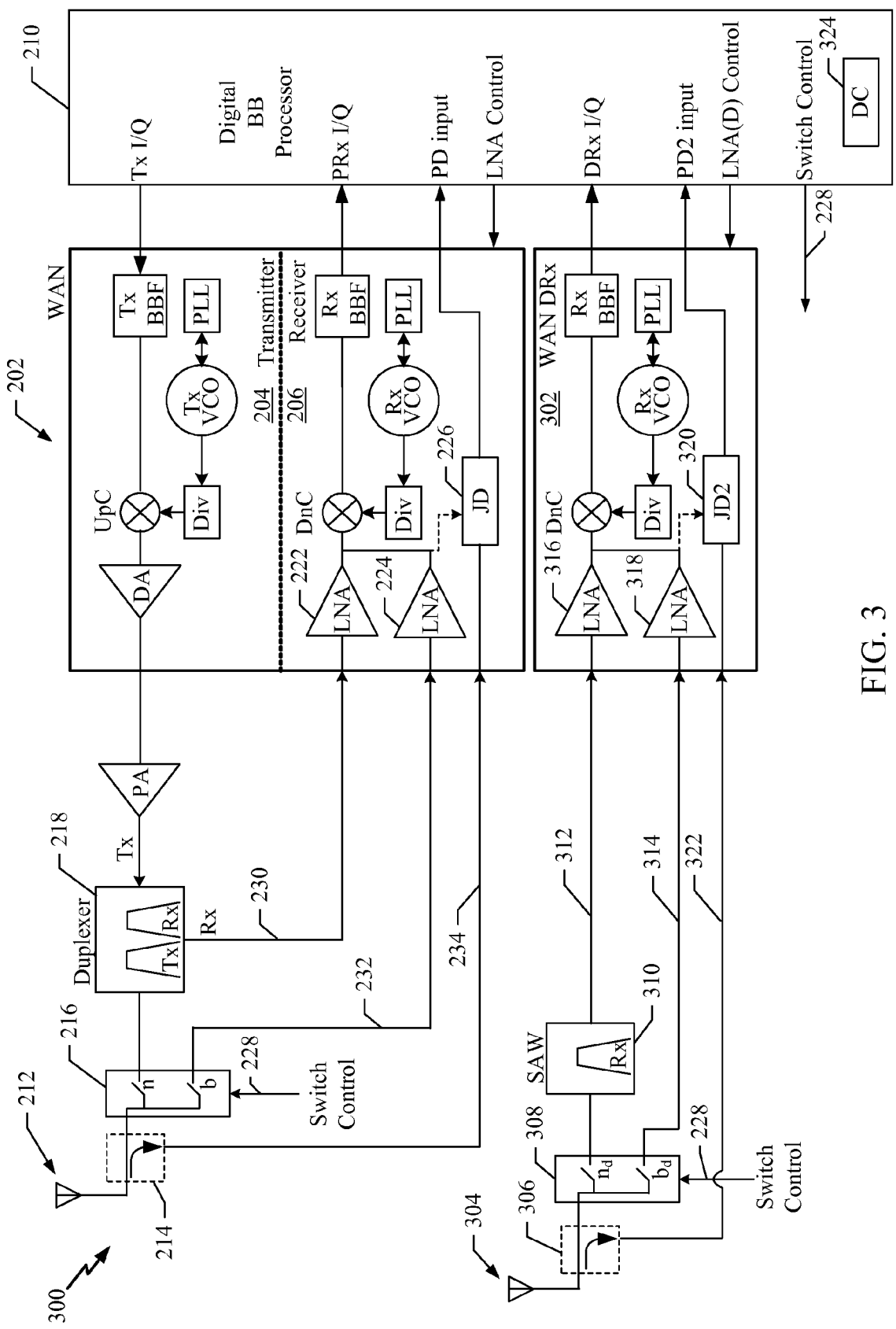
FIG. 3 shows an exemplary front end that comprises the front end shown in FIG. 2 with the addition of a diversity receiver.

FIG. 3 shows an exemplary front end 300 that comprises the front end 200 shown in FIG. 2 with the addition of a local diversity receiver 302. Although the front end 300 is shown with one diversity receiver, the various aspects are suitable for use with multiple diversity receivers.

The diversity receiver 302 operates to provide a second WAN receive signal utilizing antenna 304. A receive power coupler 306, antenna switch 308, and SAW filter 310 are also utilized with the diversity receiver 302 to allow the diversity receiver 302 to operate in bypass mode to bypass the SAW filter 310. The diversity receiver 302 also comprises LNAs 316, 318 and a second jammer detector 320.

During operation, the digital BB processor 210 outputs the switch control signal 228 to control both antenna switches 216, 308 to select either the non-bypass mode or the bypass mode. The processor 210 also outputs the diversity LNA(D) control signal to enable the appropriate LNA (either 316 or 318) based on the selected mode.

In one implementation, the processor 210 knows when and at what power level a transmission from the transmitter 204 is to occur and sets the switch control signal 228 to select the non-bypass mode for either or both the receiver 206 and the diversity receiver 302 during these transmissions. In another implementation, the receive power coupler 306 detects receive power and provides an output 322 that is input to the second jammer detector 320. The second jammer detector 320 detects the power level of the received signals over a selected frequency band (i.e., 0-12 GHz) and then outputs detection information to the second JD input of the processor 210. Based on the received power detection information from the second jammer detector 320, the processor 210 decides whether to enable the non-bypass mode or the bypass mode.

For example, if the power of received jamming signals exceeds a selected threshold, the processor 210 enables the non-bypass mode of operation; otherwise, the processor 210 enables the bypass mode of operation. Thus, a diversity signal path and a primary signal path can be used independently or in combination to determine whether the non-bypass mode or the bypass mode is utilized for each of the receivers 206 and 302.

Alternate Switch Implementations

In various implementations, the antenna switches 216 and 306 are used to route received signals to either the non-bypass or the bypass signal paths. The switches 216 and 306 comprise any suitable antenna switching devices and may have a variety of switch configurations to implement the switching functions illustrated in FIG. 3. The switches 216 and 306 have a small insertion loss (i.e., about 0.25 dB); however, such low signal loss does not appreciably affect performance, and therefore virtually any switch configuration may be used to achieve the desired improvements described herein.

Pro-Active Operation

In various aspects, pro-active operation occurs when the processor 210 operates to set the operating mode based on knowledge of transmissions by a local related transmitter. For example, the digital BB processor 210 has knowledge about when and at what power level transmissions are to be performed by the local related transmitter 204. During time intervals when the local related transmitter 204 is to transmit signals at relatively high signal power, the processor 210 outputs the switch control signal to enable non-bypass mode. During time intervals where no transmissions or low power transmissions are to occur, the processor 210 outputs the switch control signal to enable bypass mode.

Reactive Operation

In various aspects, reactive operation occurs when the processor 210 operates to set the operating mode based on knowledge of received field jammers. For example, the digital BB processor 210 has knowledge about received field jammers from the jammer detector 226. If the jammer detector 226 detects energy (in a selected frequency band) that is above a selected threshold, then the processor 210 determines that a field jammer is present and outputs the switch control signal 228 to enable the non-bypass mode. If no field jammers are detected by the jammer detector 226, the processor 210 outputs the switch control signal 228 to enable the bypass mode.

Phase Adjustment

In various implementations, a slight time delay between the bypass and the non-bypass signal paths may be experienced. For example, either signal path may utilize one or more matching networks (not shown) to provide impedance matching. This time delay difference between the two signal paths may interfere signal processing performed by the digital BB processor 210.

To compensate for any time delay differences between the bypass and non-bypass signal paths, the digital BB processor 210 comprises a delay compensator (DC) 324 that stores delay information associated with the non-bypass and bypass signal paths. The delay compensator 324 comprises a processor, memory, registers or other functional elements (not shown) that operate to compensate for time delays associated with the bypass and non-bypass signal paths. For example, the delay information can be determine at manufacture and loaded into delay compensator 324 at that time. The delay compensator 324 uses the delay information to compensate for any signal time delays that may occur as a result of switching between the non-bypass and bypass signal paths. As a result, the delay compensator 324 and the digital BB processor 210 can seamlessly compensate or correct for any time delays that may occur each time the received signals are routed between the non-bypass and bypass signal paths.

Figure 4:
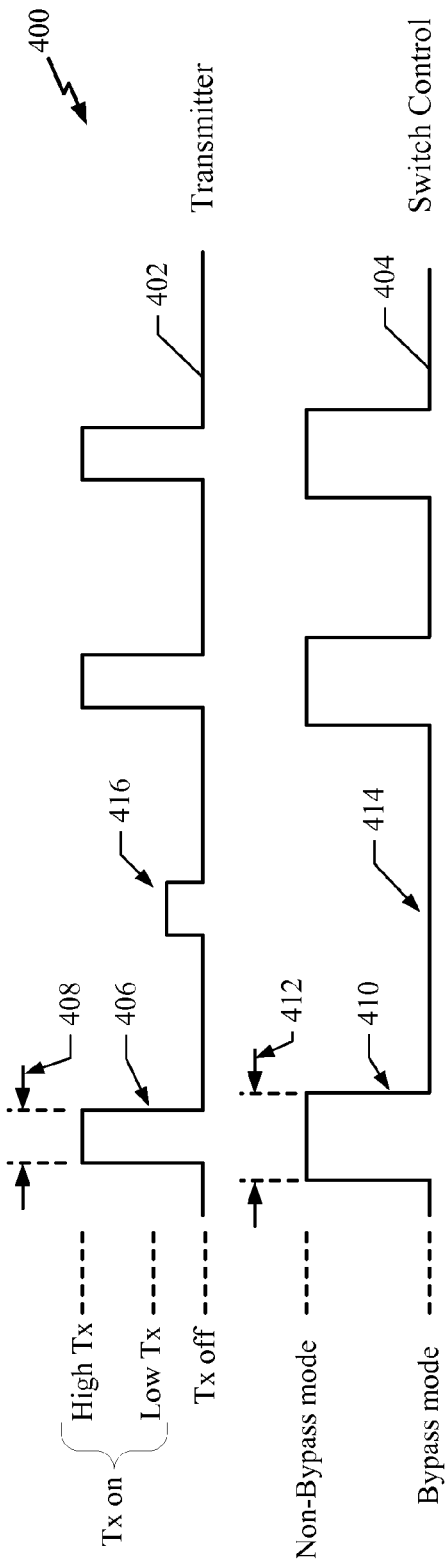
FIG. 4 shows an exemplary timing diagram illustrating the operation of the front end shown in FIG. 2 in a time division transmission environment.

FIG. 4 shows an exemplary timing diagram 400 illustrating the operation of the front end 200 shown in FIG. 2 in a time division transmission environment. For example, it will be assumed that the local transmitter 204 and related receiver 206 are communicating with a communication network utilizing a time division communication protocol, such as the Global System for Mobile communication (GSM), time division long term evolution (TD-LTE), Bluetooth or Wireless LAN. In such a protocol, the transmitter 204 transmits signals during known time intervals.

The diagram 400 comprises a plot 402 of transmission time intervals associated with the transmitter 204. For example, a first transmission interval 406 is shown during which the transmitter 204 is transmitting signals at a high power level. The duration of the transmission is indicated at 408.

The digital BB processor 210 knows about the operation of the transmitter 204 and during the transmission intervals shown in the plot 402, the digital BB processor 210 outputs the switch control signal 228 to control the antenna switch 216 to couple the antenna 212 to the non-bypass signal path 230 during high power transmission intervals and couple the antenna to the bypass signal path 232 during time intervals where no transmissions or only low power transmissions occur. For example, a transmission threshold is defined (i.e., −10 dBm) where transmissions above this threshold are considered high power transmissions, and transmissions below this threshold are considered low power transmissions.

Thus, the plot 404 shows the switch control signal, the mode selected during each transmission interval and the mode selected between transmission intervals. For example, just before the start of a high power transmission during the transmission interval 406, the non-bypass mode is enabled as indicated at 410. The non-bypass mode continues (time interval 412) until the transmission interval 406 is completed, at which time the mode is switched to the bypass mode (as shown at 414) until the next transmission interval where the transmission power level is greater than −10 dBm. For example, at transmission interval 416 a low power transmission occurs and the switch control signal is set to produce the bypass mode as indicated at 414. It should also be noted that the selection of the bypass mode may also be used during Paging operations where only the receiver is powered up to receive any paging messages. Thus, the digital BB processor 210 operates to control the mode selection based on the transmission power levels of the local related transmitter.

Figure 5:
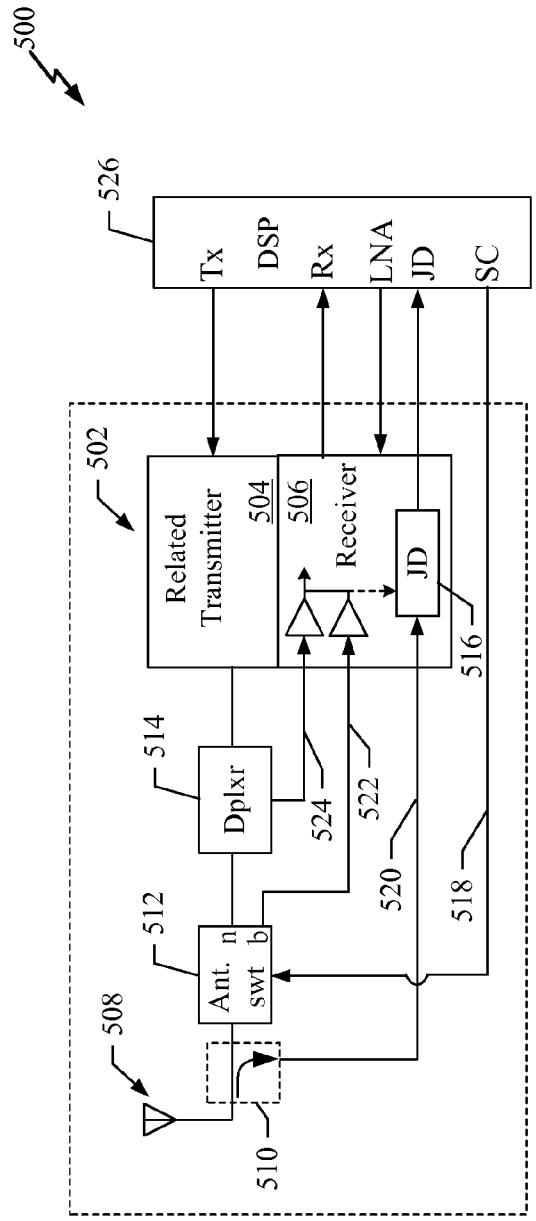
FIG. 5 shows a diagram of an exemplary front end comprising a receiver that operates with improved sensitivity.

FIG. 5 shows a diagram of an exemplary front end 500 comprising a transceiver that includes receiver 506 that operates with improved sensitivity. The front end 500 is suitable for use in a portable device comprising to communicate using any of multiple transmission technologies. For example, the transceiver may be a WAN, WLAN, Bluetooth or other transceiver and it is desirable that the receiver 506 at the device operate with the highest sensitivity.

Typically receivers comprise input filtering, such as a duplexer, which filters unwanted signals from jamming the receiver. However, when such jammers are not present or present at very low power levels, the input filtering may be unnecessary, and may in fact, insert loss into the signal path that reduces sensitivity. The front end 500 overcomes these and other deficiencies.

The front end 500 comprises digital signal processor (DSP) 526, local related transmitter 504, antenna 508, receiver power coupler 510, antenna switch 512, duplexer 512, and receiver 506.

The DSP 502 outputs signals to be transmitted by the local related transmitter 504 and these signals are transmitted using the antenna 508. The antenna 508 also receives signals for processing by the receiver 506. The switch 512 routes signals received by the antenna 508 to the duplexer 514 where undesirable signals are filtered out. For example, the duplexer 514 may be a SAW filter that has some significant level of insertion loss, for example 1 to 3 dB. The output of the filter 512 is input to the receiver 506 on a non-bypass signal path 524 for down conversion. The resulting BB signal (Rx) is input to the DSP 526 for processing.

Unfortunately, if no jamming signals or only low power jamming signals are present in the signals received by the antenna 508, the filtering performed by the duplexer 512 may not be needed but its insertion loss will still reduce the sensitivity of the receiver 506. In an exemplary implementation, the DSP 526 knows when and at what power levels transmissions by the local related transmitter 504 are to occur. During time intervals when there are no related transmissions or only low power related transmissions, the DSP 526 outputs a control signal 518 to the switch 512 causing the switch 512 to route received signals around the filter 514, (i.e., using the bypass path 522) thereby bypassing the filter 514 and avoiding its insertion loss. The received signals are received at the receiver 506 with the highest possible signal levels resulting in increased receiver sensitivity.

In another implementation, the selection between the non-bypass and the bypass signal path is made based on the received power of jamming signals received by the antenna 508. For example, received signal power is detected by receive power coupler 510. The output of the receive power coupler 510 is input to jammer detector 516. The jammer detector 516 detects whether signal power is a selected frequency band, such as a wide band, is above a threshold value. Levels above the selected threshold indicate the presence of a jamming signal. The jammer detector 516 communicates its detection result with the DSP 526. The DSP 526 can then output the switch control signal 518 to enable non-bypass mode if a jammer is detected or to enable bypass mode if no jammer is detected. In another implementation, the input to the jammer detector 516 is provided by the output of the LNAs of the receiver 506. The jammer detector 516 operates as described above to detect jammers in the LNA output signal.

Therefore, the front end 500 comprises a receiver 506 that operates with improved sensitivity in a device that operates to transmit information from a local related transmitter using any type of transmission protocol.

Figure 6:
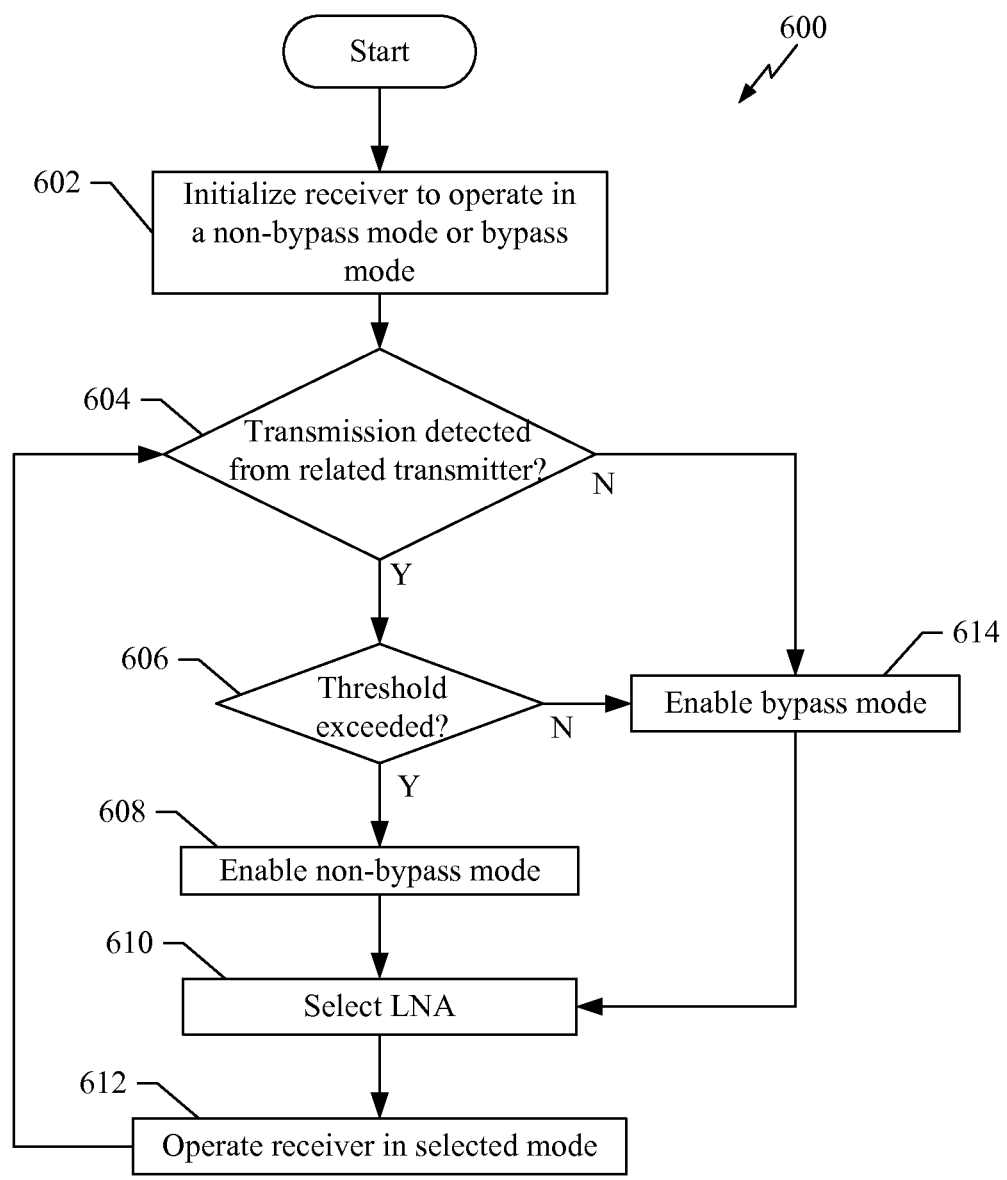
FIG. 6 shows an exemplary method for operating a receiver to achieve improved sensitivity.

FIG. 6 shows an exemplary method 600 for operating a receiver to achieve improved sensitivity. For example, in one implementation, the operations of the method 600 are performed by the front end 500.

At block 602, the receiver is initialized to operate in one of a non-bypass mode or a bypass mode. For example, the digital BB processor 526 sets the switch control signal 518 to control the antenna switch 512 to route signals received from antenna 508 to the duplexer 514 on a non-bypass signal path 524 or to route signals from the antenna 508 to the receiver 506 on a bypass signal path 522.

At block 604, a determination is made as to whether a jamming signal (jammer) from a local related transmitter is detected. For example, the digital BB processor 526 knows when transmissions from the local related transmitter 504 are to occur. If a transmission is to occur, the method proceeds to block 606. If no transmission is to occur, the method proceeds to block 614.

At block 606, a determination is made as to whether the detected transmission is (or will be) above a power level threshold. For example, the digital BB processor 526 knows the power level of transmissions from the local related transmitter 504. If the transmitted power level is to exceed a selected threshold, the method proceeds to block 608. If the power level of the transmission is equal to or below the selected threshold, the method proceeds to block 614.

At block 614, a bypass operating mode is enabled. For example, the digital BB processor 526 sets the switch control signal 518 to control the antenna switch 512 to route signals on a bypass signal path 522 that avoids the duplexer 514. In this configuration, the signals are received at the receiver 506 without experiencing the insertion loss of the duplexer 514 and therefore provide improved receiver sensitivity.

At block 608, a non-bypass mode is enabled. For example, the digital BB processor 526 sets the switch control signal 518 to control the antenna switch 512 to route signals on a non-bypass signal path 524 that includes the duplexer 514. In this configuration, the signals are filtered to remove jammers but also experience the insertion loss of the duplexer 514. The signals are thereafter received at the receiver 506 with lower signal levels resulting in the lower receiver sensitivity.

At block 610, an LNA at the receiver is selected. For example, in an implementation where the receiver comprises multiple LNAs, the appropriate LNA is selected based on the operating mode to receive signals from the antenna 508. In one implementation, the processor 526 outputs an LNA control signal (LNA) that controls the receiver 506 to enable the appropriate LNA.

At block 614, the receiver is operated in the selected mode and the method returns to block 604 to determine whether or not additional transmissions are detected.

Thus, the method 600 illustrates a method for operating a receiver in the front end to achieve improved sensitivity. It should be noted that the method 600 is just one implementation and that the operations of the method 600 may be rearranged or otherwise modified such that other implementations are possible.

Figure 7:
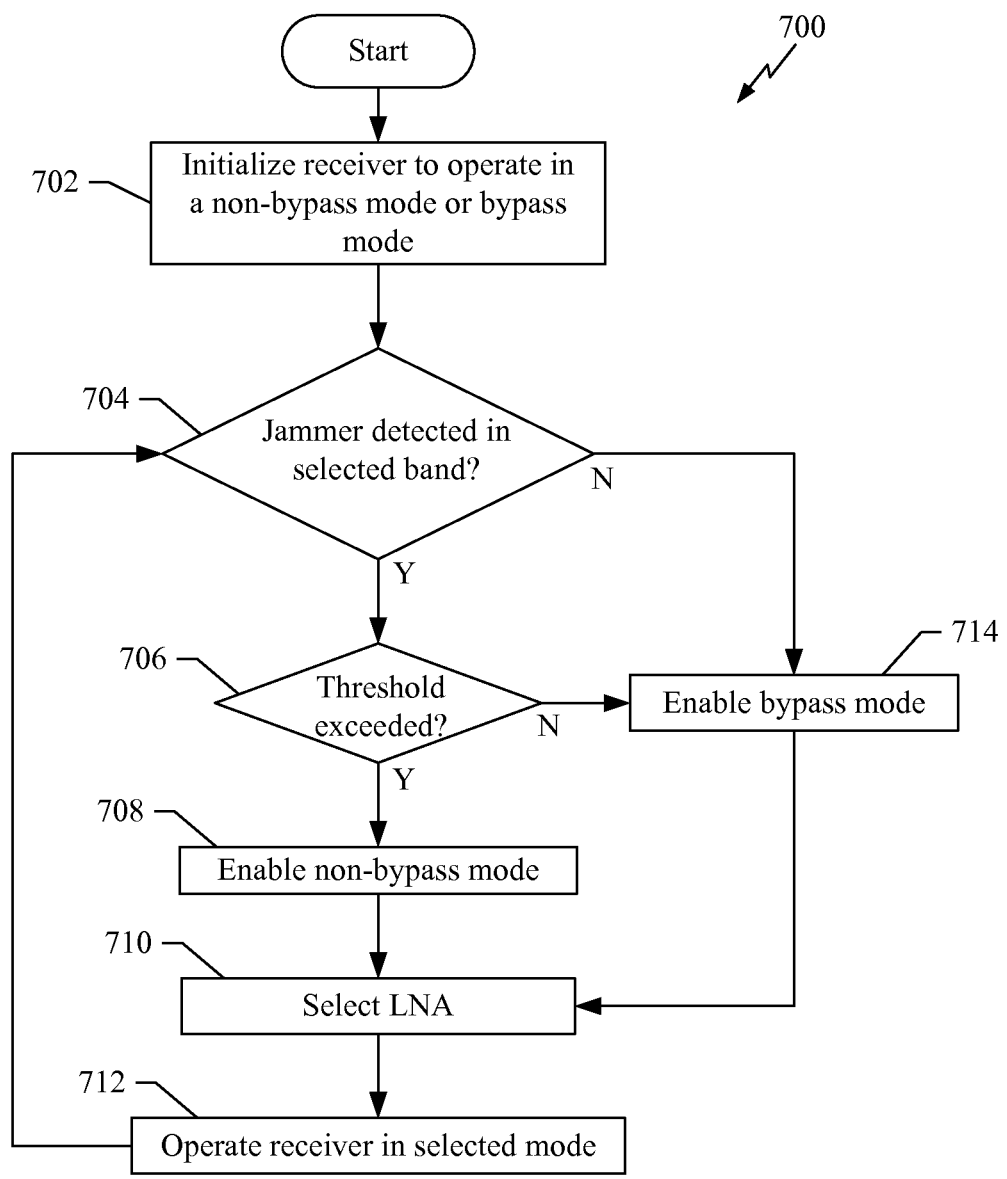
FIG. 7 shows an exemplary method for operating a receiver to achieve improved sensitivity.

FIG. 7 shows an exemplary method 700 for operating a receiver to achieve improved sensitivity. For example, in one implementation, the operations of the method 700 are performed by the front end 500.

At block 702, the receiver is initialized to operate in one of a non-bypass mode or a bypass mode. For example, the digital BB processor 526 sets the switch control signal 518 to control the antenna switch 512 to route signals received from antenna 508 to the duplexer 514 on a non-bypass signal path 524 or to route signals from the antenna 508 to the receiver 506 on a bypass signal path 522.

At block 704, a determination is made as to whether a jamming signal (jammer) from an external transmitter is detected. For example, the jammer detector 516 detects signal level in the output 520 of the receive power coupler 510. If energy in a selected band (for example, 0-12 GHz) is detected, the method proceeds to block 706. If no energy in the selected band is detected, the method proceeds to block 714. In another implementation, the jammer detector 516 detects the signal level at the output of an LNA of the receiver 506.

At block 706, a determination is made as to whether the jamming signal is above a power level threshold. For example, the jammer detector 516 operates to determine whether detected signal energy is above a selected threshold. If the signal energy is above the selected threshold, the method proceeds to block 708. If the signal energy is equal to or below the selected threshold, the method proceeds to block 714.

At block 714, a bypass operating mode is enabled. For example, the digital BB processor 526 sets the switch control signal 518 to control the antenna switch 512 to route signals from the antenna 508 on a bypass signal path 522 that avoids the duplexer 514. In this configuration, the signals are received at the receiver 506 without experiencing the insertion loss of the duplexer 514 and therefore provide improved receiver sensitivity.

At block 708, a non-bypass mode is enabled. For example, the digital BB processor 526 sets the switch control signal 518 to control the antenna switch 512 to route signals on a non-bypass signal path 524 that includes the duplexer 514. In this configuration, the signals are filtered to remove jammers but also experience the insertion loss of the duplexer 514. The signals are thereafter received at the receiver 506 with lower signal levels resulting in the lower receiver sensitivity.

At block 710, an LNA at the receiver is selected. For example, in an implementation where the receiver comprises multiple LNAs, the appropriate LNA is selected based on the operating mode to receive signals from the antenna 508. In one implementation, the processor 526 outputs an LNA control signal (LNA) that controls the receiver 506 to enable the appropriate LNA.

At block 714, the receiver is operated in the selected mode and the method returns to block 704 to determine whether or not additional jammers are detected.

Thus, the method 700 illustrates a method for operating a receiver in the front end to achieve improved sensitivity. It should be noted that the method 700 is just one implementation and that the operations of the method 700 may be rearranged or otherwise modified such that other implementations are possible. It should also be noted that the operations of the methods 600 and 700 may be combined such that the selection between the non-bypass and bypass modes is based on related local transmissions and/or received jamming signals.

Figure 8:
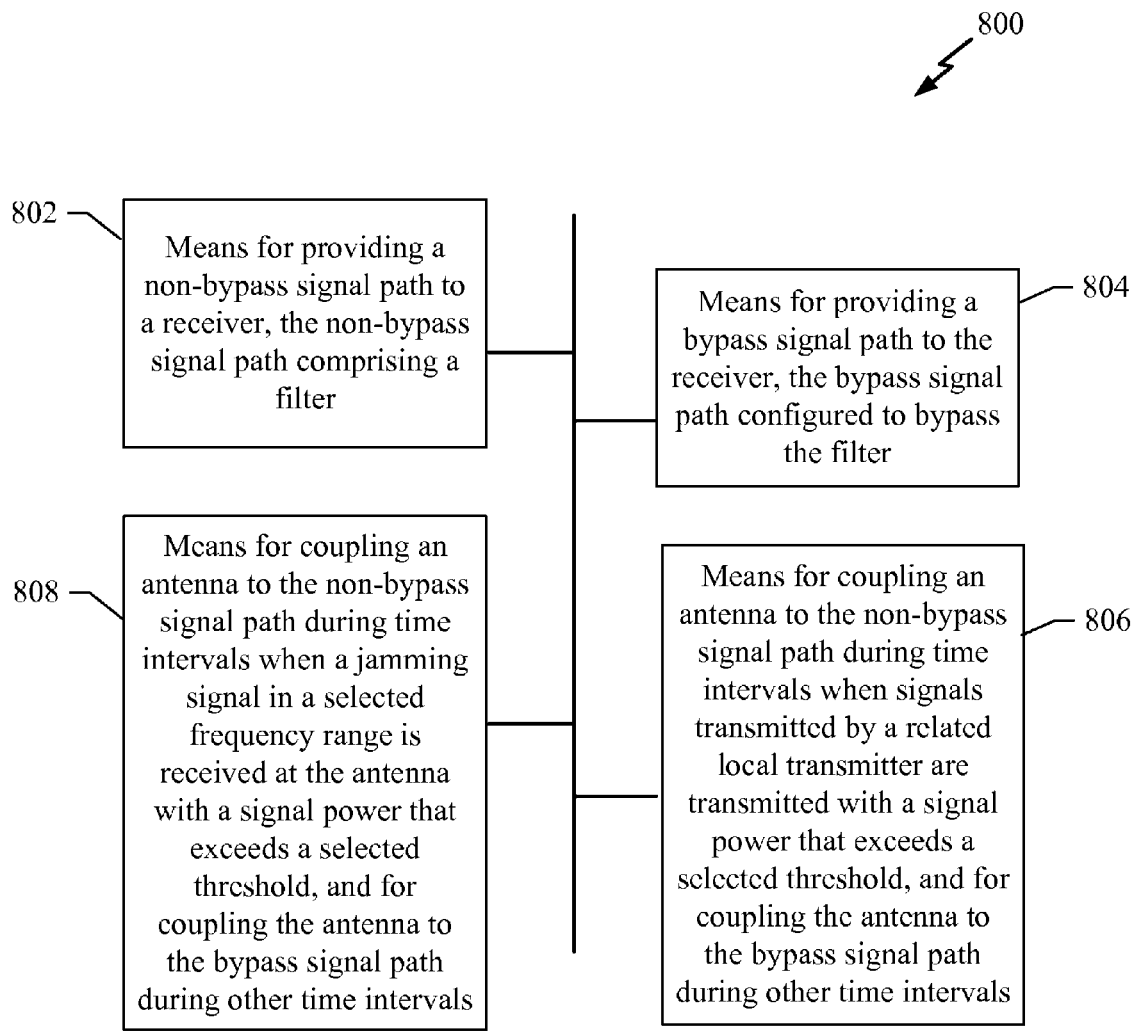
FIG. 8 shows a receiver apparatus configured to achieve improved sensitivity.

FIG. 8 shows a receiver apparatus 800 configured to operate with improved sensitivity. The apparatus 800 is suitable for use in the front end 300 shown in FIG. 3 or in the front end 500 shown in FIG. 5. In an aspect, the apparatus 800 is implemented by one or more modules configured to provide the functions as described herein. For example, in an aspect, each module comprises hardware and/or hardware executing software.

The apparatus 800 comprises a first module comprising means (802) for providing a non-bypass signal path to a receiver, the non-bypass signal path comprising a filter, which in an aspect comprises the signal path 524.

The apparatus 800 also comprises a second module comprising means (804) for providing a bypass signal path to the receiver, the bypass signal path configured to bypass the filter, which in an aspect comprises the signal path 522.

The apparatus 800 also comprises a third module comprising means (806) for coupling an antenna to the non-bypass signal path during time intervals when signals transmitted by a related local transmitter are transmitted with a signal power that exceeds a selected threshold, and for coupling the antenna to the bypass signal path during other time intervals, which in an aspect comprises the antenna switch 512.

The apparatus 800 also comprises a fourth module comprising means (808) for coupling an antenna to the non-bypass signal path during time intervals when a jamming signal in a selected frequency range is received at the antenna with a signal power that exceeds a selected threshold, and for coupling the antenna to the bypass signal path during other time intervals, which in an aspect comprises the jammer detector 516.

Those of skill in the art would understand that information and signals may be represented or processed using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. It is further noted that transistor types and technologies may be substituted, rearranged or otherwise modified to achieve the same results. For example, circuits shown utilizing PMOS transistors may be modified to use NMOS transistors and vice versa. Thus, the amplifiers disclosed herein may be realized using a variety of transistor types and technologies and are not limited to those transistor types and technologies illustrated in the Drawings. For example, transistors types such as BJT, GaAs, MOSFET or any other transistor technology may be used.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both non-transitory computer storage media and communication media including any medium that facilitates transfer of a computer program from one place to another. A non-transitory storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The description of the disclosed exemplary embodiments is provided to enable any person skilled in the art to make or use the invention. Various modifications to these exemplary embodiments will be readily apparent to those skilled in the art, and the generic principles defined herein may be applied to other embodiments without departing from the spirit or scope of the invention. Thus, the invention is not intended to be limited to the exemplary embodiments shown herein but is to be accorded the widest scope consistent with the principles and novel features disclosed herein.

What is claimed is:

1. An apparatus comprising:
    a non-bypass signal path coupled to a receiver, the non-bypass signal path comprising a filter;
    a bypass signal path coupled to the receiver, the bypass signal path configure to bypass the filter;
    a processor configured to output a control signal that indicates predetermined time intervals when signals are transmitted by a related local transmitter with a signal power that exceeds a selected threshold, the control signal output prior to the signal being received; and
    a switch configured to receive the control signal, and in response, to couple an antenna to the non-bypass signal path during the predetermined time intervals and to couple the antenna to the bypass signal path during other time intervals.

2. The apparatus of claim 1, the filter comprising at least one of a SAW filter, a FBAR filter, a BAW filter, and a MEMS filter.

3. The apparatus of claim 1, the receiver comprising a first low noise amplifier (LNA) coupled to the non-bypass signal path and a second LNA coupled to the bypass signal path.

4. The apparatus of claim 1, the processor comprising a baseband processor.

5. The apparatus of claim 1, the processor configured to enable a first amplifier to receive signals from the antenna during the predetermined time intervals and to enable a second amplifier to receive the signals from the antenna during the other time intervals.

6. An apparatus comprising:
    means for providing a non-bypass signal path to a receiver, the non-bypass signal comprising a filter;
    means for providing a bypass signal path to the receiver, the bypass signal path configured to bypass the filter;
    means for outputting a control signal that indicates predetermined time intervals when signals are transmitted by a related local transmitter with a signal power that exceeds a selected threshold, the control signal output prior to the signal being received; and
    means for receiving the control signal, and in response, to couple an antenna to the non-bypass signal path during the predetermined time intervals and to couple the antenna to the bypass signal path during other time intervals.

7. The apparatus of claim 6, the filter comprising at least one of a SAW filter, a FBAR filter, a BAW filter, and a MEMS filter.

8. The apparatus of claim 6, the receiver comprising a first low noise amplifier (LNA) coupled to the non-bypass signal path and a second LNA coupled to the bypass signal path.

9. A method comprising:
    detecting whether a local transmitter is to transmit a signal with a signal power that exceeds a selected threshold;
    enabling a non-bypass mode prior to receiving the transmitted signal if the local transmitter is to transmit the signal with the signal power that exceeds the selected threshold; and
    enabling a bypass mode prior to receiving the transmitted signal if the local transmitter will not transmit the signal with the signal power that exceeds the selected threshold.

10. The method of claim 9, said enabling the non-bypass mode comprising coupling an antenna to a receiver using a non-bypass signal path configured to provide signal filtering.

11. The method of claim 10, said enabling the bypass mode comprising coupling the antenna to the receiver using a bypass signal path configured to bypass the signal filtering.

12. The method of claim 11, further comprising:
    coupling a first low noise amplifier (LNA) to the non-bypass signal path; and
    coupling a second LNA to the bypass signal path.

* * * * *